(12) United States Patent
Wang et al.

(10) Patent No.: US 11,404,906 B1
(45) Date of Patent: Aug. 2, 2022

(54) POWER FAILURE PROTECTION SYSTEM FOR SOLID STATE DRIVES

(71) Applicant: SK hynix Inc., Gyeonggi-do (KR)

(72) Inventors: Wenwei Wang, San Jose, CA (US);
Hao Tian, San Jose, CA (US);
Xiaofang Chen, Milpitas, CA (US);
Danyang Qiao, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/322,207

(22) Filed: May 17, 2021

(51) Int. Cl.
*G06F 1/30* (2006.01)
*H02J 9/06* (2006.01)

(52) U.S. Cl.
CPC ............. *H02J 9/068* (2020.01); *G06F 1/30* (2013.01)

(58) Field of Classification Search
CPC .................................. H02J 9/068; G06F 1/30
See application file for complete search history.

(56) References Cited

U.S. PATENT DOCUMENTS

| | | | |
|---|---|---|---|
| 2004/0140718 A1* | 7/2004 | Wise, Jr. ............... | H02J 9/04 307/75 |
| 2004/0257271 A1* | 12/2004 | Jacobson ............... | G01S 7/282 342/175 |
| 2008/0191552 A1* | 8/2008 | Suzuki ............... | G06F 1/30 307/23 |
| 2012/0201062 A1 | 8/2012 | Lee | |
| 2018/0229968 A1 | 8/2018 | Cheng et al. | |

* cited by examiner

*Primary Examiner* — Rexford N Barnie
*Assistant Examiner* — Thai H Tran
(74) *Attorney, Agent, or Firm* — IP & T Group LLP

(57) ABSTRACT

A power failure protection system is provided for a solid state drive. In an embodiment, the system includes: power converters; a stand-by power converter; a power switch array including power switch pairs; and a power control complex programmable logic device. The power control complex programmable logic device monitors power failures of the power converters; when a power failure of a particular power converter is detected, configures a power level for the stand-by power converter, the configured power level corresponding to the failed power converter; and controls a target power switch pair corresponding to the failed power converter such that an operation voltage generated by the stand-by power converter is applied to an internal component.

20 Claims, 11 Drawing Sheets

POWER FAILURE PROTECTION SYSTEM FOR SOLID STATE DRIVES

BACKGROUND

1. Field

Embodiments of the present disclosure relate to a power supply system for a data storage device.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

A data storage device such as a sold state drive (SSD) may include a power supply system.

SUMMARY

Aspects of the present invention include a system for power failure protection of a data storage device such as a solid state drive.

In one aspect of the present invention, a power failure protection system for a solid state drive includes: a plurality of power converters, each power converter providing a set operation voltage to an internal component of the solid state drive; a stand-by power converter configured to provide a stand-by operation voltage to the internal component; a power switch array including a plurality of power switch pairs, each power switch pair including a first power switch coupled between a power converter among the plurality of power converters and the internal component, and a second power switch coupled between the stand-by power converter and the internal component; and a power control complex programmable logic device. The power control complex programmable logic device is configured to: monitor power failures of the plurality of power converters; when a power failure of a particular power converter among the plurality of power converters is detected, configure a power level for the stand-by power converter, the configured power level corresponding to the failed power converter; and control a target power switch pair corresponding to the failed power converter such that an operation voltage generated by the stand-by power converter is applied to the internal component through the second power switch of the target power switch pair.

In another aspect of the present invention, a solid state drive includes: an internal component including a memory device, a buffer memory and a memory controller which are coupled to each other; and power failure protection system configured to receive power from a host, generate one or more various operation power voltages and provide one of the operation voltages to the internal component. The power failure protection system includes: a plurality of power converters, each power converter providing a set operation voltage to the internal component; a stand-by power converter configured to provide a stand-by operation voltage to the internal component; a power switch array including a plurality of power switch pairs, each power switch pair including a first power switch coupled between a power converter among the plurality of power converters and the internal component, and a second power switch coupled between the stand-by power converter and the internal component; and a power control complex programmable logic device configured to: monitor power failures of the plurality of power converters; when a power failure of a particular power converter among the plurality of power converters is detected, configure a power level for the stand-by power converter, the configured power level corresponding to the failed power converter; and control a target power switch pair corresponding to the failed power converter such that an operation voltage generated by the stand-by power converter is applied to the internal component through the second power switch of the target power switch pair.

Additional aspects of the present invention will become apparent from the following description.

DETAILED DESCRIPTION

Figure 1:
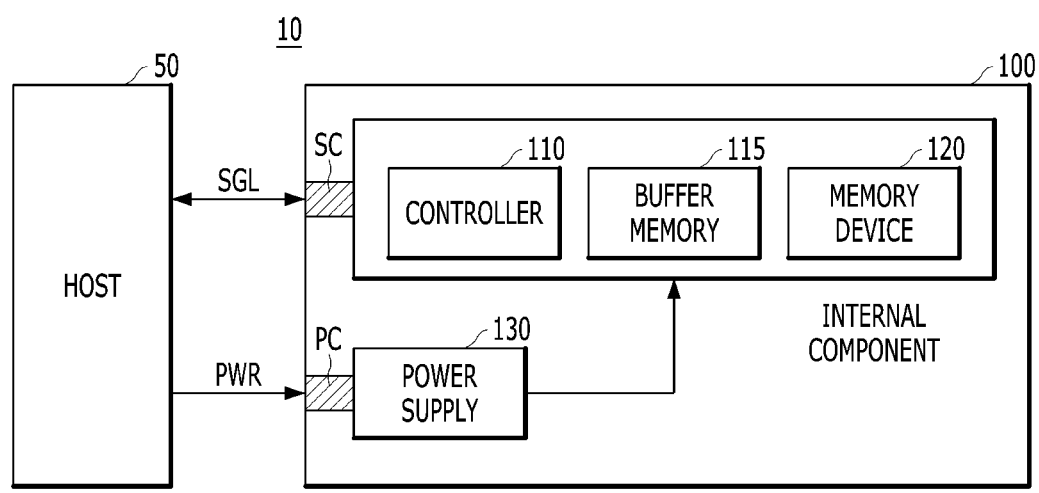
FIG. 1 is a block diagram illustrating an example of a data processing system in accordance with an embodiment of the present invention.

Various embodiments of the present disclosure are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating an example of a data processing system 10 in accordance with an embodiment of the present invention.

Referring to FIG. 1, the data processing system 10 may include a host device 50 and a storage device (which may be implemented as a memory system) 100. The storage device 100 may receive a request from the host device 50 and operate in response to the received request. For example, the storage device 100 may store data to be accessed by the host device 50.

The host device 50 may be implemented with any of various types of electronic devices. In various embodiments, the host device 50 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 50 may include a portable electronic device such as a mobile phone, a smart phone, an e-book, an MP3 player, a portable multimedia player (PMP), and/or a portable game player.

The storage device 100 may include an internal component and a power supply 130. The internal component may include a memory controller 110, a buffer memory 115 and a memory device 120. In some implementations, the buffer memory 115 may be included in the memory controller 110. The internal component, i.e., the memory controller 110 may exchange a signal SGL (which may represent multiple signals) with the host device 50 through a signal connector SC. The signal SGL may include a command, an address, and data. The signal connector SC may be configured as any of various types of connectors according to an interface scheme between the host device 50 and the storage device 100.

The memory controller 110 may control overall operation of the memory device 120 in response to a signal SGL from the host device 50. For example, the controller 110 may control the memory device 120 to perform one or more erase, program, and read operations.

The memory device 120 may be coupled to the controller 110 through one or more channels. The memory device 120 may be implemented with a plurality of nonvolatile memory devices. The controller 110 and the memory device 120 may be implemented with any of various types of storage devices such as a solid state drive (SSD) and a memory card.

The buffer memory 115 may be configured to store system data used in the storage device 100. For example, the buffer memory 115 may store a map table, which is mapping information of addresses used in the host device 50 and may temporarily store data transmitted between the host device 50 and the storage device 100. The buffer memory 1200 may be configured of volatile memory cells for a fast operation speed. For example, the volatile memory cells may be configured of a dynamic random access memory (DRAM) or a static random access memory (SRAM). In some embodiments, the buffer memory 1200 may be implemented with a double data rate (DDR) SDRAM buffer.

The power supply 130 may provide components in the storage device 100 with power PWR inputted through a power connector PC from the host device 50.

Figure 2:
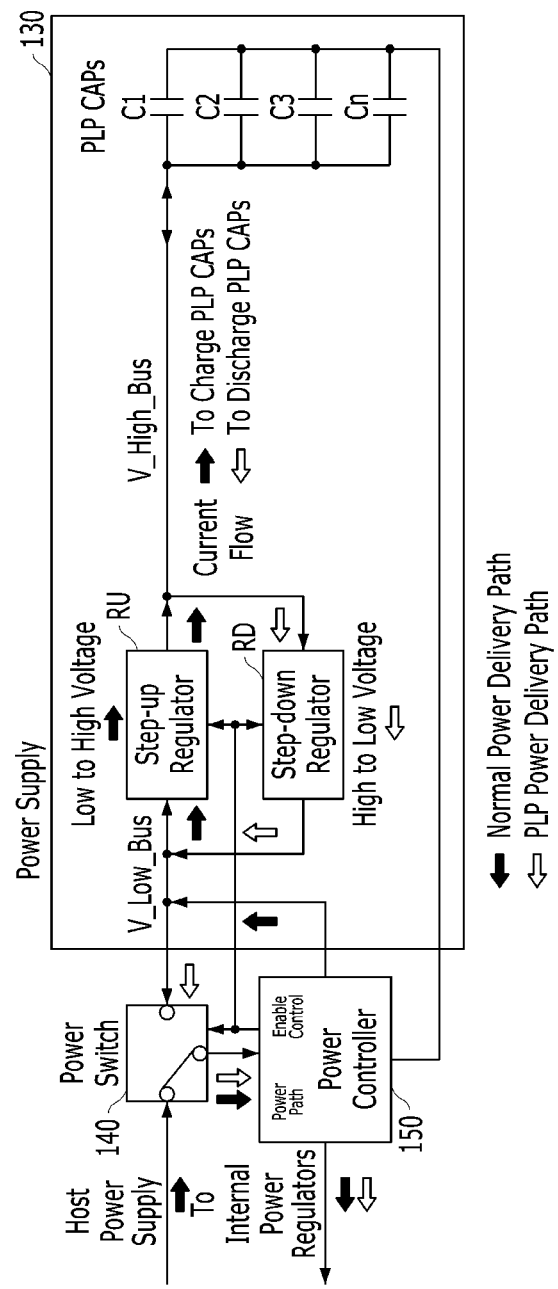
FIG. 2 is a diagram illustrating an example of a power supply for a storage device in accordance with an embodiment of the present invention.

FIG. 2 is a diagram illustrating an example of the power supply 130 for the storage device 100 in accordance with an embodiment of the present invention.

Referring to FIG. 2, the power supply 130 may include a plurality of capacitors Cl to Cn, a voltage step-up regulator RU and a voltage step-down regulator RD. Although not shown in FIG. 1, the storage device 100 may further include a power switch 140 and a power controller 150 coupled to the power supply 130, as shown in FIG. 2.

The power switch 140 may provide a normal power delivery path or a power loss protection (PLP) delivery path under control of the power controller 150. In the normal power delivery path, power provided from the host device 50 is delivered through the power switch 140, the power controller 150, and the voltage step-up regulator RU to the plurality of capacitors Cl to Cn. The voltage step-up regulator RU may convert a low input voltage from the host device 50 to a high voltage (e.g., 35V or more). The high voltage may be used to charge the plurality of capacitors Cl to Cn. The power supply 130 may include a first path (i.e., V_High_Bus) to pass power (i.e., a high voltage) between the voltage regulator RU, RD and the plurality of capacitors Cl to Cn, and a second path (i.e., V_Low_Bus) to pass power (i.e., a low voltage) between the voltage regulator RU, RD and the host device 50 through the power switch 140. Further, the power supply 130 may include a third path to pass a signal to the voltage regulator RU, RD from the power controller 150.

When power to the storage device 100 from the host device 50 is interrupted or cut-off, the plurality of capacitors Cl to Cn may be discharged and the energy stored therein may be delivered through the PLP delivery path including the voltage step-down regulator RD, the power switch 140, the power controller 150 and internal power regulators. The storage device 100 may use the plurality of capacitors as a power source to back up data from an internal memory of the controller 110 (e.g., volatile memory) to the memory device 120 (e.g., NAND flash device).

As such, the plurality of capacitors C1 to Cn may form a capacitor array to provide sufficient energy to maintain power rail voltages for data back-up transfer from the controller 110 to the memory device 120. The capacitor array or a large bulk capacitor may serve as a power loss protection (PLP) capacitor for the storage device 100. The step-up regulator RU may be implemented with a voltage regulator including switching components (e.g., FETs), which is normally used for high power conversion efficiency. The step-up regulator RU may be connected to the PLP capacitor through the power path V_High_Bus. The power paths V_High_Bus and V_Low_Bus may be implemented in a printed circuit board (PCB) of the storage device 100 (e.g., a solid state drive (SSD)) by using one or more power planes or layer.

Referring back to FIG. 1, unlike hard disk drives (HDDs), the storage device 100 such as solid state drives (SSDs) need to protect data in the buffer memory 115 (e.g., DDR buffer) from power failure. The protection is vital because the data of the buffer memory 115 contains address mapping information for user data stored in the memory device 120 (e.g., NAND flash memory). The location of data changes dynamically though a particular mechanism, e.g., a write levelling to make the usage of the NAND flash memory 120 evenly to prolong its life time. Without the address mapping information, the user data become unrecoverable from the storage device 100. When a main power failure from the host device 50 is detected, the storage device 100 may switch to use the power from the internal power supply 130 (e.g., power loss protection (PLP) capacitors of FIG. 2) as the temporary energy source for a short amount of time to move necessary data from the buffer memory 115 to the NAND flash memory 120.

Figure 3A:
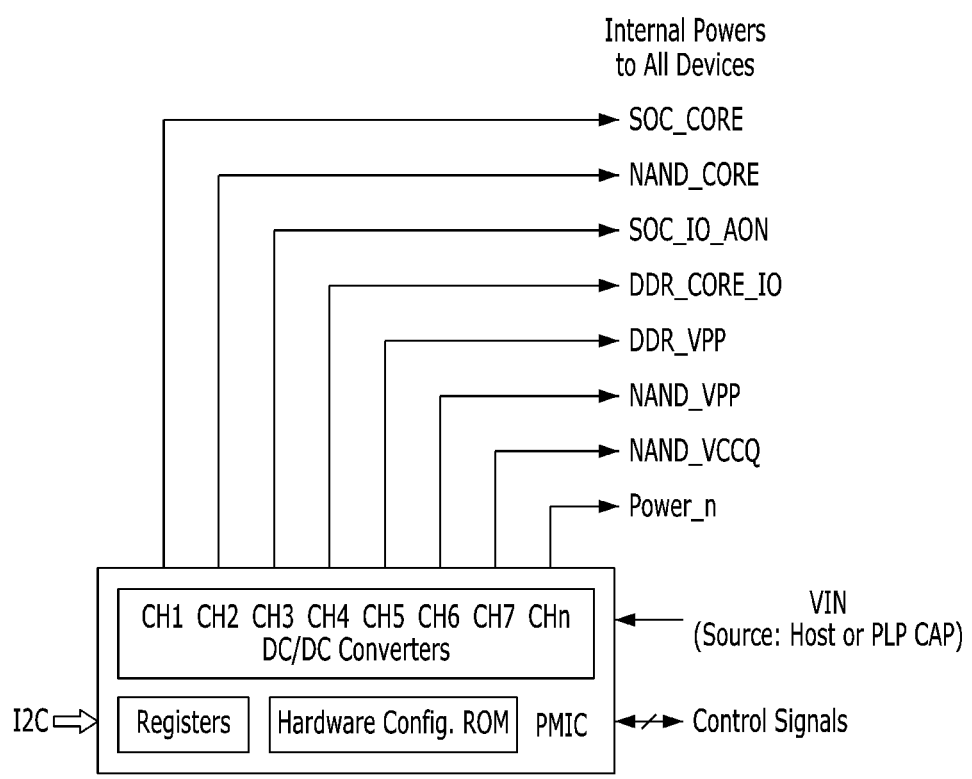
FIG. 3A is a diagram illustrating an example of providing internal powers for a solid state drive in accordance with an embodiment of the present invention.
Figure 3B:
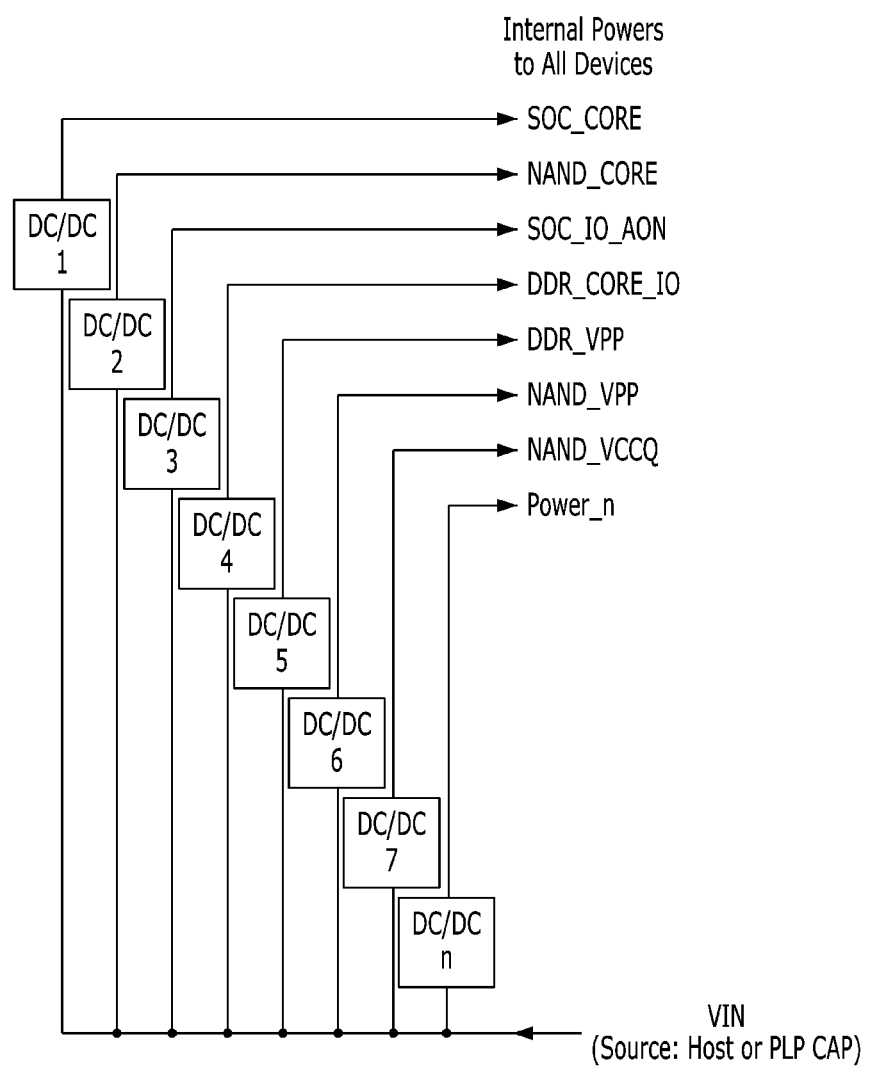
FIG. 3B is a diagram illustrating another example of providing internal powers for a solid state drive in accordance with an embodiment of the present invention.

The power from the host device 50 or the PLP capacitors in the power supply 130 may be converted through a number of power converters (e.g., direct current (DC)-DC converters) into internal powers of the storage device 100. Examples of devices for providing internal powers for SSDs are shown in FIGS. 3A and 3B. Devices of FIGS. 3A and 3B may be coupled to the power controller 150 of FIG. 2. Alternatively, devices of FIGS. 3A and 3B may be implemented inside the power supply 130. Devices of FIGS. 3A and 3B may receive, as an input power, a power source VIN from the host device 50 or the PLP capacitors of the power supply 130 and generate various operation voltages with different voltage levels.

In FIG. 3A, internal powers for SSDs are converted by a plurality of DC-DC converters implemented in a power management integrated circuit (PMIC). SSDs have been evolving to use a single PMIC for all internal power supplies. The single PMIC includes the plurality of DC-DC converters and has multiple output channels (e.g., n channels CH1 to CHn) corresponding to the plurality of DC-DC converters. Converters have different maximum voltage limits and maximum current limits for SSDs. Further, the PMIC may include a hardware configurable ROM and registers. The hardware configurable ROM may be configured to meet a specific SSD power design requirement and may be controlled by the hardware code preprogrammed into the ROM. An inter-integrated circuit (I2C) bus may be connected between a system-on-chip (SoC) controller and the registers of the PMIC. Thus, firmware (FW) of the controller may read or write the registers for various miscellaneous (misc.) configurations to perform special tasks such as PLP capacitors health check, and to obtain the working status of all internal DC-DC converters. Additionally, the PMIC may output, to the SoC controller, some special control signals such as hardware reset, power failure interrupt, PLP capacitors power warning and etc. The PMIC also receives, from the SoC controller, control signals such as the interrupt to indicate whether data flush from the buffer memory 115 to the memory device 120 is done.

In FIG. 3B, internal powers for SSDs are converted by multiple discrete DC-DC converters. The multiple discrete DC-DC converters may be hardwired and not programmable for the flexibility such as power sequence adjustment. There is no communication between the DC-DC converters and the SoC controller.

Various operation voltages for SSDs may be provided to the internal component such as the memory controller (e.g., system-on-chip (SoC) controller) 110, the buffer memory 115, the memory device 120 and miscellaneous (misc.) devices. In the illustrated examples of FIGS. 3A and 3B and without any limitation, SSDs may use multiple operation voltages (e.g., 8 voltages) as shown and defined in List 1:

List 1:
1) SoC_Core: shared by SoC core and its misc. blocks with the same voltage level
2) SoC_IO_AON: shared by SoC general IO block and SSD misc. devices
3) NAND_Core: dedicated for the core of all NAND flash memory devices
4) NAND_IO: shared by IO of all NAND flash devices, and SoC NAND block
5) NAND_VPP: dedicated for the programming of all NAND flash memory devices
6) DDR_Core_IO; shared by the core and IO of all DDR buffer devices, and SoC DDR block
7) DDR_VPP: dedicated for the programming of all DDR devices
8) Power_n: misc. power supplies As shown in List 1, operation voltages for SSDs may include voltages for the memory controller 110 (i.e., SoC_Core, SoC_IO_AON), voltages for the buffer memory 115 (i.e., DDR_Core_IO, DDR_VPP), voltages for the memory device 120 (i.e., NAND_Core, NAND_IO, NAND_VPP) and voltages for misc. devices (i.e., Power_n).

SSDs do not have power protection components from the failure of the power supplies (i.e., DC-DC converters). The failure of any internal power supply may stop the operation of SSDs and cause the loss of internal data, e.g., the loss of address mapping information in the buffer memory 115. As a result, the user data stored in the memory device 120 cannot be retrieved. Accordingly, it is desirable to protect the internal power supplies for SSDs against the internal power failure.

Embodiments provide systems and methods for internal power failure protection for the storage devices (e.g., SSDs). In some embodiments, an internal power protection system for an SSD may instantly switch the internal power from a failed power supply to the stand-by power supply, when such a power failure of the failed power supply is detected by the system. As a result, the SSD may continue to work normally without any data loss. In addition, the SoC controller of the SSD may receive an interrupt signal from the system to take the proper actions.

Figure 4:
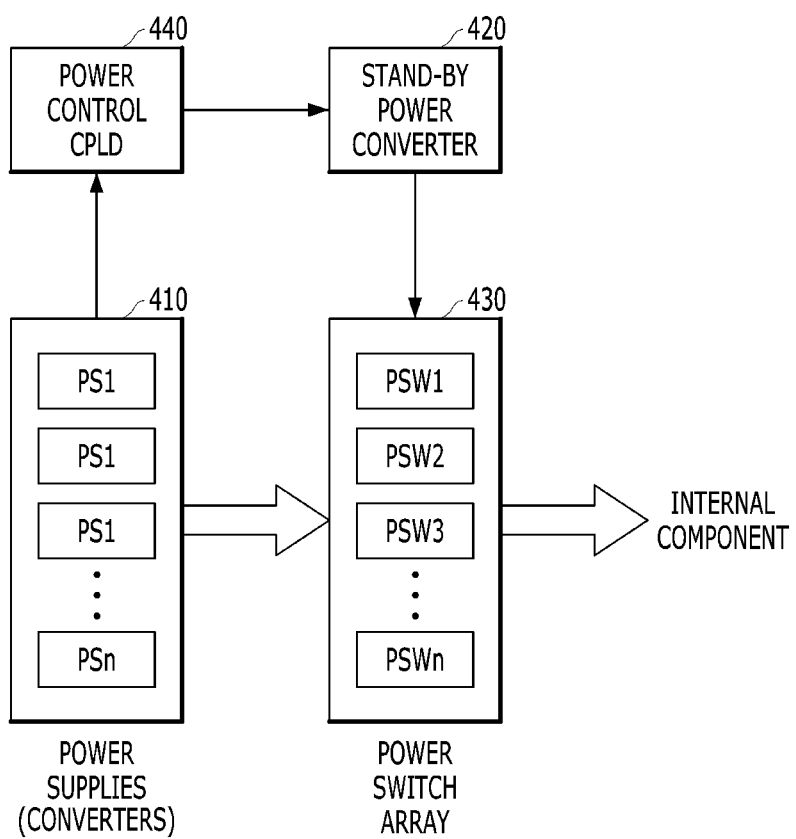
FIG. 4 is a diagram illustrating a power protection system in accordance with an embodiment of the present invention.

FIG. 4 is a diagram illustrating a power protection system 400 in accordance with an embodiment of the present invention. By way of example and without any limitation, the power protection system 400 may be used for a storage device such as a solid state drive.

Referring to FIG. 4, the power protection system 400 may include a plurality of power converters PS1-PSn 410, a stand-by power converter 420, a power switch array 430 and a power control complex programmable logic device (CPLD) 440.

The plurality of power converters PS1-PSn 410 may receive input power, generate various operation voltages with different voltage level and provide the operation voltages through the power switch array 430. In some embodiments, each power converter may be an internal power regulator in FIG. 2 which receives the input power from the host device 50 or the power supply 130 of FIG. 2 and generates a set operation voltage for an internal component (e.g., the memory controller 110, the buffer memory 115 and the memory device 120).

Figure 5:
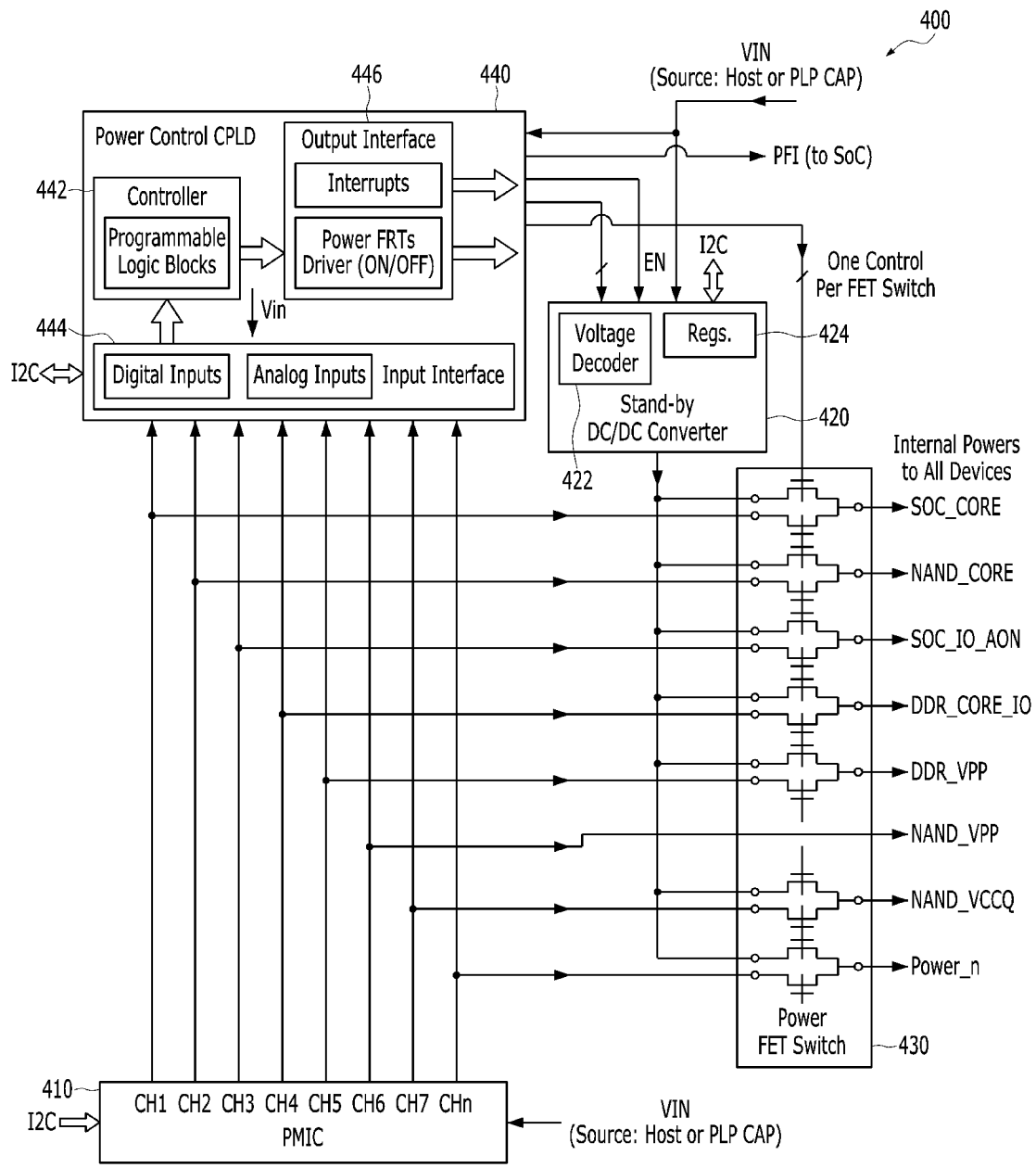
FIG. 5 is a diagram illustrating an example of a power protection system in accordance with an embodiment of the present invention.
Figure 6:
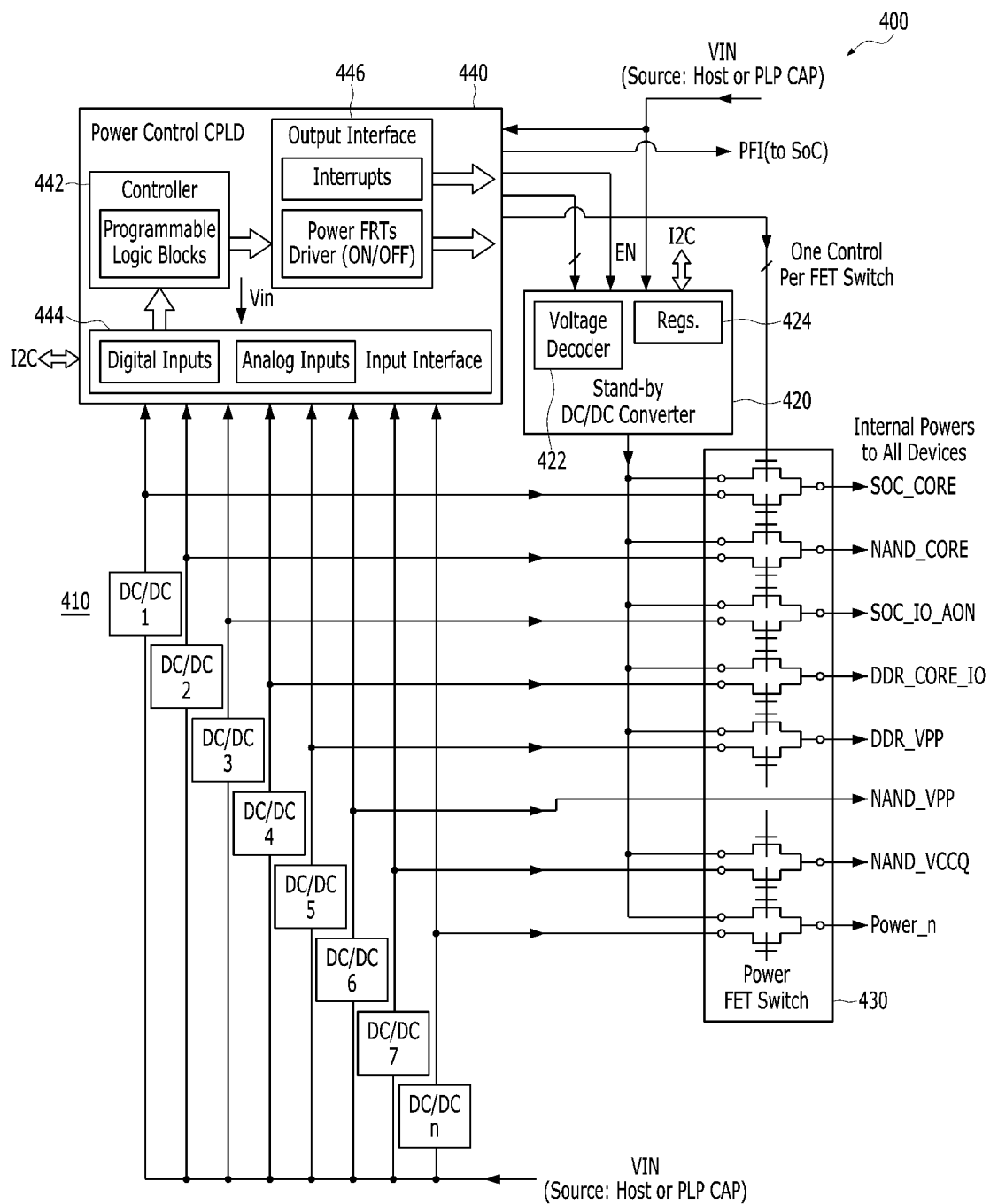
FIG. 6 is a diagram illustrating another example of a power protection system in accordance with an embodiment of the present invention.

In an embodiment, the plurality of power converters PS1-PSn 410 may be a plurality of direct current (DC)-DC converters which are implemented in the power management integrated circuit (PMIC) as shown in FIGS. 3A and 5. In another embodiment, the plurality of power converters PS1-PSn 410 may be multiple discrete DC-DC converters as shown in FIGS. 3B and 6.

The stand-by power converter 420 may generate a stand-by operation voltage under the control of the power control CPLD 440 and provide the stand-by operation voltage to the internal component through the power switch array 430. The stand-by operation voltage may be a voltage to replace the operation voltage to be generated by the failed power converter among the plurality of power converters 410.

In some embodiments, the stand-by power converter 420 may be shared by all internal power supplies (i.e., power converters PS1-PSn) which need the power failure protection. The output voltage level of the stand-by power converter 420 may be configured through its internal register by the power control CPLD 440.

The power switch array 430 may include a plurality of power switch pairs PSW1-PSWn corresponding to the plurality of power converters PS1-PSn 410. Each power switch pair may include a first power switch (i.e., a bottom switch) coupled between a power converter among the plurality of power converters PS1-PSn 410 and the internal component, and a second power switch (i.e., a top switch) coupled between the stand-by power converter 420 and the internal component.

In some embodiments, each power switch pair may include two power field effect transistors (FETs) which includes the first power switch (i.e., FET_bottom) and the second power switch (i.e., FET_top).

The power control CPLD 440 may monitor power failures of the plurality of power converters PS1-PSn 410. When a power failure of a particular power converter among the plurality of power converters PS1-PSn 410 is detected, the power control CPLD 440 may configure a power level for the stand-by power converter 420. The configured power level may correspond to the failed power converter. Further, the power control CPLD 440 may control a target power switch pair corresponding to the failed power converter such that an operation voltage generated by the stand-by power converter 420 is applied to the internal component through the second power switch of the target power switch pair.

In some embodiments, the power control CPLD 440 may monitor all internal power supplies for under-voltage and over-voltage events, based on preset thresholds for each of the internal power supplies. Once the failure of an internal power converter is detected, the power control CPLD 440 may immediately configure the output voltage level of the stand-by power converter 420 to be the same as that of the failed internal power supply. At the same time, the power control CPLD 440 may control the power FET switch pair so that the power source of the failed internal power converter may be switched from the failed power converter to the stand-by power converter 420.

As noted above, the plurality of power converters PS1-PSn 410 may be a plurality of direct current (DC)-DC converters which are implemented in the power management integrated circuit (PMIC) as shown in FIG. 5 or multiple discrete DC-DC converters as shown in FIG. 6. In FIG. 5, the plurality of power converters PS1-PSn 410 in the PMIC may be coupled to the power switch array 430 and the power control CPLD 440 through multiple PMIC channels. In FIG. 6, the multiple discrete DC-DC converters 410 may be hardwired and be coupled to the power switch array 430 and the power control CPLD 440.

Referring to FIGS. 5 and 6, the power switch array 430 may be implemented with a plurality of power switches, i.e., an array of power FETs. Two of power FETs may form a pair of FET_top and FET_bottom. In each power FETs pair, FET_bottom may be coupled to the corresponding power converter among the plurality of power converters 410 and FET_top may be coupled to the stand-by power converter 420. Each power FETs pair may be controlled by the power control CPLD 440. The plurality of power switches may provide various operation voltages for internal components of SSDs. In some embodiments, as shown in List 1, operation voltages for SSDs may include voltages for the memory controller 110 (i.e., SoC_Core, SoC_IO_AON), voltages for the buffer memory 115 (i.e., DDR_Core_IO, DDR_VPP), voltages for the memory device 120 (i.e., NAND_Core, NAND_IO, NAND_VPP) and voltages for misc. devices (i.e., Power_n).

The power control CPLD 440 may include a controller 442, an input interface 444 and an output interface 446. The input interface 444 may receive analog inputs and digital inputs and transmit digital outputs. The analog inputs may include operation voltages of the plurality of power converters 410 and input voltage Vin from the host device 50 or the power supply 130 (i.e., PLP capacitors).

The controller 442 may monitor the operation voltages of the plurality of power converters 410 using the analog inputs of the input interface 444 to detect the power failure of the failed power converter. The controller 442 may use set voltage levels to determine if any of the power converters has a failure of under-voltage or over-voltage. Alternatively, the detection of the power failure of the failed power converter may be performed by the input interface 444. Further, the controller 442 may control the input interface 444 and the output interface 446 based on the detection of the power failure of the failed power converter.

The input interface 444 may receive, from the controller 442, digital inputs corresponding to a voltage level of the failed power converter based on the detection of the power failure of the failed power converter. Further, the digital inputs may include signals from other devices. The input interface 444 may communicate with the stand-by power converter 420 to adjust a voltage equal to a set voltage level of the failed power converter. In some embodiments, the input interface 444 may communicate with the stand-by power converter 420 through an inter-integrated circuit (I2C) bus.

The output interface 446 may include an interrupt generator and a power switch (i.e., FET) driver which are controlled by the controller 442. The interrupt generator may generate an interrupt signal to inform that the power failure of the failed power converter has occurred. In some embodiments, the output interface 446 may generate power failure interrupt (PFI) and provide the PFI to the SoC controller 110.

The power switch (i.e., FET) driver may drive the target power switch pair among the power switch array 430. The power switch driver may output an enable signal EN to the target power switch pair corresponding to the failed power converter. The enable signal EN may disable the first power switch of the target power switch pair and enable the second power switch of the target power switch pair such that the stand-by power converter 420 is coupled to the internal component.

In some embodiments, the power switch driver may include multiple power FET drivers corresponding to the plurality of power FET pairs. When there is no power failure detected, the power FET_top is turned off, and the power FET_bottom is turned on, for each of the FET pair. Thus, the internal power gets power from its corresponding power converter. When an internal power failure is detected, the power FET_top is turned on, and the power FET_bottom is turned off. Thus, the internal power supply gets power from the stand-by power converter 420.

Figure 7:
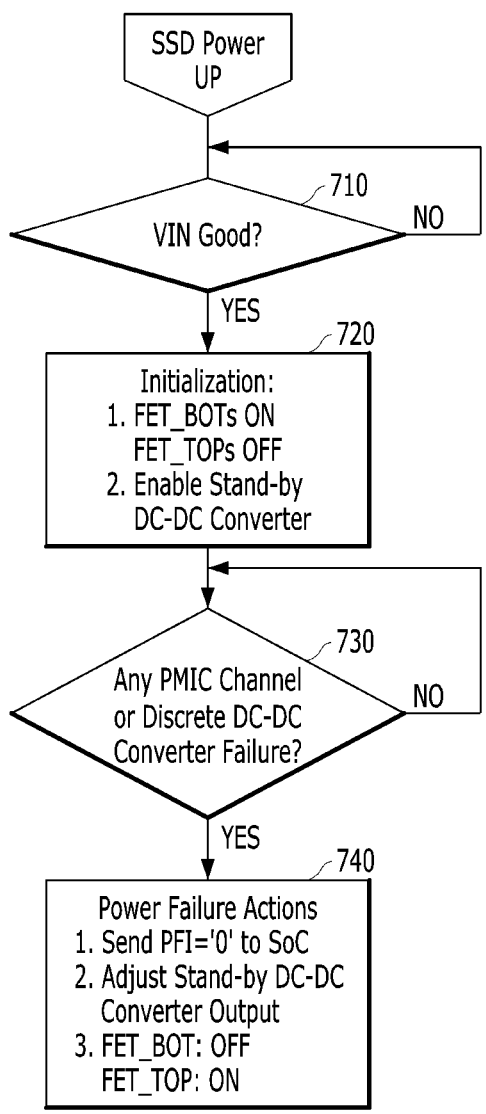
FIG. 7 is a flowchart illustrating an operating method of a power protection system in accordance with an embodiment of the present invention.

FIG. 7 is a flowchart illustrating an operating method of a power protection system 400 in accordance with an embodiment of the present invention. The operating method of FIG. 7 may be realized by the power control CPLD 440 through a hardware description language (HDL) code.

Referring to FIG. 7, after powered-up of SSD, at operation 710, the power control CPLD 440 may determine whether input voltage VIN is good. When it is determined that the input voltage VIN is good, at operation 720, the power control CPLD 440 may perform an initialization operation. For this operation, the power control CPLD 440 may turn on all first power switches (i.e., FET_bottoms (FET_BOTs)) and turn off all second power switches (i.e., FET_tops (FET_TOPs)). Further, the power control CPLD 440 may enable the stand-by power converter (i.e., DC-DC converter) 420.

At operation 730, the power control CPLD 440 may monitor power failures of the plurality of power converters to detect a power failure of a particular power converter (i.e., any PMIC channel or discrete DC-DC converter) among the plurality of power converters 410. When the power failure of the particular power converter is detected, at operation 740, the power control CPLD 440 may perform power failure actions. First, the power control CPLD 440 may send a power failure interrupt (PFI) (e.g., a logic level '0') to the SoC controller 110 by controlling the interrupt generator of the output interface 446. Second, the power control CPLD 440 may adjust the output of the stand-by power converter 420 to the voltage level of the failed power converter by controlling the interface interface 444. Third, the power control CPLD 440 may control a target power switch pair corresponding to the failed power converter. In other words, the power control CPLD 440 may turn off the FET_bottom (FET_BOT) of the target power switch pair and turn on the FET_top (FET_TOP) of the target power switch pair.

Referring back to FIGS. 5 and 6, the stand-by power converter 420 may include a voltage decoder 422 and registers (Regs) 424. The voltage decoder 422 may receive, from the power control CPLD 440, multiple signals corresponding to multiple voltage levels of the stand-by power converter 420 through a hardwired path and decode a corresponding voltage level. For example, 3 signals may be deployed to indicate 8 voltage levels. The registers (Regs) 424 receive, from the power control CPLD 440, a voltage level to adjust the output voltage of the stand-by power converter 420 through I2C bus.

In some embodiments, the power control CPLD 440 may use the combination of the hardwired path and the I2C bus to adjust the output voltage of the stand-by power converter 420. Since the hardwired path is faster than the I2C bus, the hardwired path may be used as the first step and the I2C bus may be used as the second step. At the first step, the hardwired path may be used to quickly but roughly set the output voltage of the stand-by DC-DC converter 420 to the approximate level. At the second step, the I2C bus may be used to accurately adjust the output voltage of the stand-by DC-DC converter 420 to the desired level.

In some embodiments, the stand-by power converter 420 may be a small one channel PMIC with a step-down buck inside since all internal power supplies use step-down bucks, except the operation voltage NAND_VPP. The operation voltage NAN D_VPP uses a step-up boost but does not require to be protected due to the fact that the NAND flash memory has internal boost to be switched.

When power up, the stand-by power converter 420 may boot to output a default voltage set by the step-down buck manufacturer. Once power-up, the output of the stand-by power converter 420 may then be adjusted through its internal registers 424 controlled by the power control CPLD 440 via the I2C bus.

In some embodiments, the output of the stand-by power converter 420 may be set to be the mid-voltage level of all internal power converters. This scheme may reduce the transition time for the voltage to ramp up or ramp down as needed. In some embodiments, the power capacity of the stand-by power converter 420 may match with the highest capacity among all power converters.

In the power protection system 400 of FIGS. 5 and 6, the total transition time from the detection of an internal power failure to the stable output of the stand-by DC-DC converter 420 may be limited by the minimum allowed voltage drop level of the failed internal power. The total transition time of the power protection system 400 mainly consists of failure detection by the power control CPLD 440, the communication between the power control CPLD 440 and the stand-by DC-DC converter 420, the output voltage adjustment of the stand-by DC-DC converter 420, and the switching of the corresponding power FETs switch among the power FETs switch array 430. Among them, the communication between the power control CPLD 440 and the stand-by DC-DC converter 420 via I2C bus to set the desired output voltage of the stand-by DC-DC converter 420 consumes most of time.

Figure 8A:
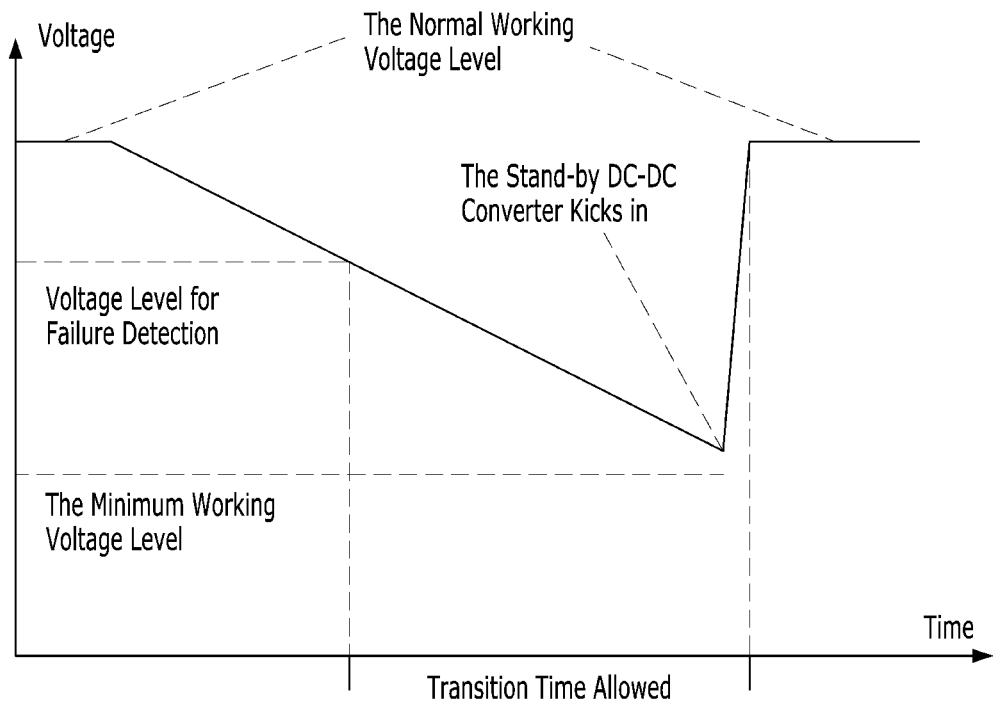
FIGS. 8A and 8B are diagrams illustrating examples of a power voltage transition process in accordance with an embodiment of the present invention.

FIG. 8A shows the internal power voltage transition process with the under-voltage failure vs. the total transition time allowed in accordance with an embodiment of the present invention.

Referring to FIG. 8A, it is required that the stand-by DC-DC converter 420 completes its output voltage adjustment and kick in before the internal power voltage level drops to the minimum working voltage level. For this requirement, a set of output signals from the power control CPLD 440 are provided to the stand-by DC-DC converter 420 through a hardwired path. The set of output signals may be decoded by the voltage decoder 422 of the stand-by DC-DC converter 420 as the desired voltage level to be set. For example, 3 signals may be deployed to indicate 8 voltage levels. The signal provision of the hardwired path is much faster than the communication through the I2C bus to write the registers 424 of the stand-by DC-DC converter 420. Since the I2C bus operation may set the voltage level with much finer resolution, two paths may be used by the power control CPLD 440 as noted above. That is, the hardwired path may be used as the first step and then the I2C path may be used as the second step.

Figure 8B:
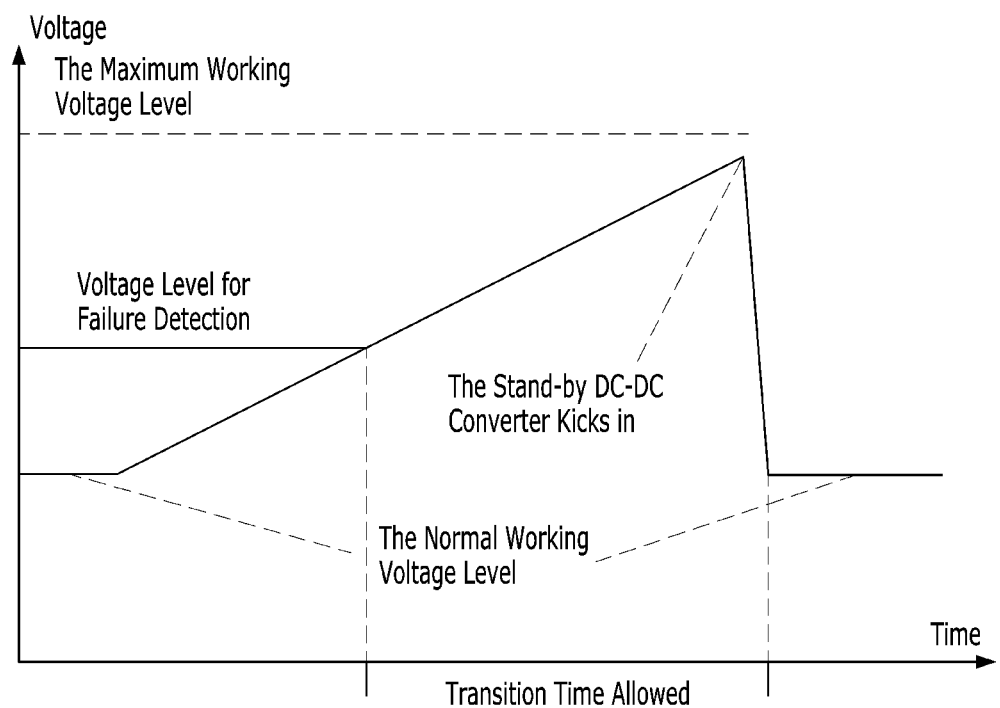

Similarly, the scheme of FIG. 8A may be applied to FIG. 8B which shows the internal power voltage transition process with the over-voltage failure vs. the total transition time allowed.

Referring to FIG. 8B, it is required that the stand-by DC-DC converter 420 completes its output voltage adjustment and kick in before the internal power voltage level boosts to the maximum working voltage level. For this requirement, a set of output signals from the power control CPLD 440 are provided to the stand-by DC-DC converter 420 through a hardwired path. The set of output signals may be decoded by the voltage decoder 422 of the stand-by DC-DC converter 420 as the desired voltage level to be set. For example, 3 signals may be deployed to indicate 8 voltage levels. The signal provision of the hardwired path is much faster than the communication through the I2C bus to write the registers 424 of the stand-by DC-DC converter 420. Since the I2C bus operation may set the voltage level with much finer resolution, two paths may be used by the power control CPLD 440 as noted above. That is, the hardwired path may be used at first and then the I2C path may be used.

In FIGS. 8A and 8B, due to the transition time limit allowed by the minimum or maximum working voltage level, it might not be practical to implement the time-consuming double check function to filter out the potential false power failure event during the power failure detection. However, the power voltage naturally contains the noise and glitch which can possibly obscure the failure trigger level. For this, a post-check scheme may be performed as shown in FIG. 9.

Figure 9:
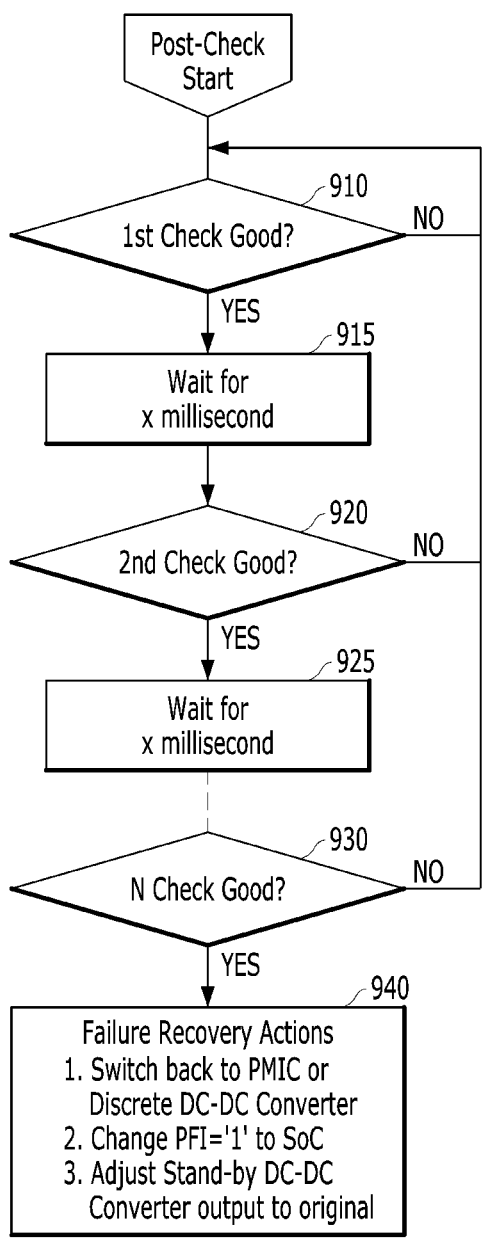
FIG. 9 is a flowchart illustrating a post-check operation of a power protection system in accordance with an embodiment of the present invention.

FIG. 9 is a flowchart illustrating a post-check operation of a power protection system 400 in accordance with an embodiment of the present invention.

The power control CPLD 440 of the power protection system 400 still monitors the output of the failed power converter (i.e., the failed PMIC channel or the failed discrete DC-DC converter) to perform the post-check operation of FIG. 9 after the internal power is switched to the stand-by DC-DC converter 420 upon a failure event.

Referring to FIG. 9, the power control CPLD 440 may perform the post-check operation according to "N-striking filtering", where N may be 1, 2, 3 or more. At operation 910, the power control CPLD 440 may check the output of the failed power converter. When it is check that the output of the failed power converter is good, the power control CPLD 440 may wait a set time period (e.g., x millisecond) at operation 915. After elapsing the set time period, the power control CPLD 440 may check the output of the failed power converter again at operation 920. In other words, the set time period x is inserted between the consecutive checks to wait for the voltage to bounce back to the bad level again in order to filter out possible voltage noise and glitch. In some embodiments, x may be set by the power control CPLD 440 to match with the actual power noise profile. Any check failure in the consecutive checks may start the whole process over from the 1st check at operation 910. As such, the power control CPLD 440 may perform N consecutive checks of the output of the failed power converter. What it is determined that all N consecutive checks are good means that the previous failure on the failed power converter is actually false. Thus, at operation 940, the power control CPLD 440 may take failure recovery actions. Failure recovery actions may include 1) switching the internal power back to the failed power converter (i.e., the PMIC channel or the DC-DC converter) (i.e., recovering the failed power converter); 2) changing the PFI from a logic level '0' to a logic level '1' to inform the SoC controller 110 of the false failure event; and 3) adjusting the output of the stand-by DC-DC converter 420 back to the original set voltage level (e.g., the mid-voltage level of all internal power converters).

As described above, embodiments provide a power failure protection system capable of constantly monitoring any internal power failure event in a storage device such as SSDs. Once a power failure is detected, the system immediately adjusts the output voltage level of the stand-by DC-DC converter to match with that of the failed power converter and replace the failed power converter with the stand-by DC-DC converter (i.e., disconnects the failed power converter and connects the stand-by DC-DC converter). The system also sends a signal to inform the SoC controller of the internal power failure event. Embodiments reduce data loss due to internal power failures of SSDs and provide an effective internal power loss protection in SSDs.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims. Furthermore, the embodiments may be combined to form additional embodiments.

What is claimed is:

1. A power failure protection system for a solid state drive, the power failure protection system comprising:
    a plurality of power converters, each power converter providing a set operation voltage to an internal component of the solid state drive;
    a stand-by power converter configured to provide a stand-by operation voltage to the internal component;
    a power switch array including a plurality of power switch pairs, each power switch pair including a first power switch coupled between a power converter among the plurality of power converters and the internal component, and a second power switch coupled between the stand-by power converter and the internal component; and
    a power control complex programmable logic device configured to:
       monitor power failures of the plurality of power converters;
       when a power failure of a particular power converter among the plurality of power converters is detected, configure a power level for the stand-by power converter, the configured power level corresponding to the failed power converter; and
       control a target power switch pair corresponding to the failed power converter such that an operation voltage generated by the stand-by power converter is applied to the internal component through the second power switch of the target power switch pair.

2. The power failure protection system of claim 1, wherein the plurality of power converters includes a plurality of direct current (DC)-DC converters which are included in a power management integrate circuit (PMIC) or discrete direct current (DC)-DC converters.

3. The power failure protection system of claim 1, wherein each power switch in each of the plurality of power switch pairs includes a power field effect transistor (FET).

4. The power failure protection system of claim 1, wherein the power control complex programmable logic device includes:
an input interface configured to receive operation voltages of the plurality of power converters and communicate with the stand-by power converter to adjust a voltage equal to a set voltage level of the failed power converter; and
an output interface configured to generate an interrupt signal to inform that a power failure of the failed power converters has occurred and drive the target power switch pair; and
a controller configured to monitor the operation voltages of the plurality of power converters to detect the power failure of the failed power converter and control the output interface to drive the target power switch pair based on the detection of the power failure of the failed power converter.

5. The power failure protection system of claim 4, wherein the output interface includes a power switch driver, and
wherein the controller is configured to control the power switch driver to disable the first power switch of the target power switch pair and enable the second power switch of the target power switch pair such that the stand-by power converter is coupled to the internal component.

6. The power failure protection system of claim 4, wherein the output interface includes an interrupt generator to generate the interrupt signal and transmit the interrupt signal to a memory controller of the solid state drive.

7. The power failure protection system of claim 4, wherein the stand-by power converter has a power capacity of the highest power converter among the plurality of power converters and is set to have a mid-voltage level of all of the plurality of power converters.

8. The power failure protection system of claim 4, wherein the power control complex programmable logic device communicates with the stand-by power converter through a combination of a hardwired path and an inter-integrated circuit (I2C) bus.

9. The power failure protection system of claim 4, wherein the power control complex programmable logic device checks whether the failed power converter operates normally after switching from the failed power converter to the stand-by power converter.

10. The power failure protection system of claim 9, wherein the power control complex programmable logic device checks multiple times in a set period whether the failed power converter operates normally.

11. The power failure protection system of claim 9, wherein the power control complex programmable logic device recovers the failed power converter by controlling the target power switch pair corresponding to the failed power converter such that a voltage generated by the recovered power converter is applied to the internal component through the first power switch of the target power switch pair when it is checked that the failed power converter operates normally.

12. The power failure protection system of claim 1, wherein the internal component includes a memory controller, a memory device and a buffer memory which are coupled to each other.

13. A solid state drive comprising:
an internal component including a memory device, a buffer memory and a memory controller which are coupled to each other; and
a power failure protection system configured to receive a power from a host, generate one or more various operation power voltages and provide one of the operation voltages to the internal component,
wherein the power failure protection system includes:
a plurality of power converters, each power converter providing a set operation voltage to the internal component;
a stand-by power converter configured to provide a stand-by operation voltage to the internal component;
a power switch array including a plurality of power switch pairs, each power switch pair including a first power switch coupled between a power converter among the plurality of power converters and the internal component, and a second power switch coupled between the stand-by power converter and the internal component; and
a power control complex programmable logic device configured to:
monitor power failures of the plurality of power converters;
when a power failure of a particular power converter among the plurality of power converters is detected, configure a power level for the stand-by power converter, the configured power level corresponding to the failed power converter; and
control a target power switch pair corresponding to the failed power converter such that an operation voltage generated by the stand-by power converter is applied to the internal component through the second power switch of the target power switch pair.

14. The solid state drive of claim 13, wherein the plurality of power converters includes a plurality of direct current (DC)-DC converters which are included in a power management integrate circuit (PMIC) or discrete direct current (DC)-DC converters, and
wherein each power switch in each of the plurality of power switch pairs includes a power field effect transistor (FET).

15. The solid state drive of claim 13, wherein the power control complex programmable logic device includes:
an input interface configured to receive operation voltages of the plurality of power converters and communicate with the stand-by power converter to adjust a voltage equal to a set voltage level of the failed power converter; and
an output interface configured to generate an interrupt signal to inform that a power failure of the failed power converter has occurred and drive the target power switch pair; and
a controller configured to monitor the operation voltages of the plurality of power converters to detect the power failure of the failed power converter and control the output interface to drive the target power switch pair based on the detection of the power failure of the failed power converter.

16. The solid state drive of claim 15, wherein the output interface includes a power switch driver, and
wherein the controller is configured to control the power switch driver to disable the first power switch of the target power switch pair and enable the second power switch of the target power switch pair such that the stand-by power converter is coupled to the internal component.

17. The solid state drive of claim 15, wherein the output interface includes an interrupt generator to generate the interrupt signal and transmit the interrupt signal to the memory controller.

18. The solid state drive of claim 15, wherein the stand-by power converter has a power capacity of the highest power converter among the plurality of power converters and is set to have a mid-voltage level of all of the plurality of power converters.

19. The solid state drive of claim 15, wherein the power control complex programmable logic device communicates with the stand-by power converter through a combination of a hardwired path and an inter-integrated circuit (I2C) bus.

20. The solid state drive of claim 15, wherein the power control complex programmable logic device:
   checks multiple times in a set period whether the failed power converter operates normally after switching from the failed power converter to the stand-by power converter; and
   recovers the failed power converter by controlling the target power switch pair corresponding to the failed power converter such that a voltage generated by the recovered power converter is applied to the internal component through the first power switch of the target power switch pair when it is checked that the failed power converter operates normally.

\* \* \* \* \*